Jan. 31, 1950     A. K. DVORAK     2,496,152

CONVERTIBLE FEATURE FOR STUFFED DOLLS AND ANIMALS

Filed March 21, 1945

*INVENTOR.*
ANN KAZIMIR DVORAK
BY
*Zoltan Holocsek*
*ATTORNEY.*

Patented Jan. 31, 1950

2,496,152

UNITED STATES PATENT OFFICE 2,496,152

CONVERTIBLE FEATURES FOR STUFFED DOLLS AND ANIMALS

Ann Kazimir Dvorak, New York, N. Y.

Application March 21, 1945, Serial No. 583,969

6 Claims. (Cl. 46—135)

This invention relates to new and useful improvements in a doll with convertible features.

More particularly, the invention is intended for stuffed dolls, and stuffed animal figures.

The new and improved stuffed doll or animal is provided with features, for example simulating the eyes, nose, mouth, etc. which may be moved, or converted, so as to change the expression or appearances of the doll or animal.

The invention contemplates the use of a plurality of buttons mounted through the outer layer of material of the stuffed doll, or animal upon which the feature members are mounted. It is contemplated that these feature members be removable and exchangeable.

The invention also proposes that the buttons be turnable and movable, so as to change the inclination of the feature members to change the features of the doll; for example, the slant of the eyes may be changed. The tilt of the mouth may be changed, etc.

The invention still further contemplates the use of prongs on the backs of buttons releasably engageable with the outer material of the stuffed doll, or animal by which the buttons are releasably held. The prongs may be disengaged and then the buttons may be turned, or moved.

The invention also contemplates a modified form in which the buttons are connected together for unitary movement so that when one button is turned, the motion will be transmitted to move, or turn the other buttons.

Still further the invention proposes the construction of a convertible feature doll, or animal which is simple to manufacture, durable and which may be sold at a low cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 1:
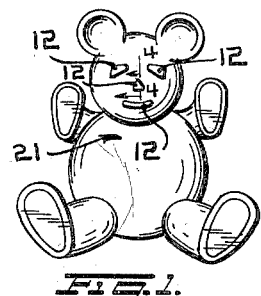
Fig. 1 is an illustration of a stuffed animal provided with convertible features in accordance with this invention.

The new and improved stuffed doll, or animal in accordance with this invention has an outer layer of covering material 10. Buttons 11 are turnably mounted through the outer layer 10 at feature points. Feature members 12 are mounted upon said buttons 11. The buttons 11 are associated with means by which they may be held in various turned positions.

The means referred to at the end of the previous paragraph includes a plurality of prongs 14 projecting from the buttons 11 and normally engaging into or through the outer layer 10. Each button 11 is fixedly attached to the outer end of a stem 15 which is turnably mounted through an eyelet 16 mounted through the outer layer of material 10. The inner end of each stem is provided with a head 17. A small expansion spring 18 acts between the head 17 and the eyelet 16 for normally urging the stem 15 inwards. These springs 18 urge the buttons 11 against the outer layer 10 and so indirectly urge the prongs 14 into, or through the material of the outer layer 10.

The feature members 12 are provided with prongs 20 which engage around the edge portions of the buttons 11 by which the feature members are removably mounted on the buttons. The prongs 20 may be loosened, or opened. Then the feature members may be removed and replaced.

Figure 2:
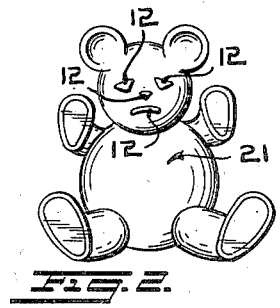
Fig. 2 is an illustration of the stuffed animal shown in Fig. 1 with the features in different positions.
Figure 3:
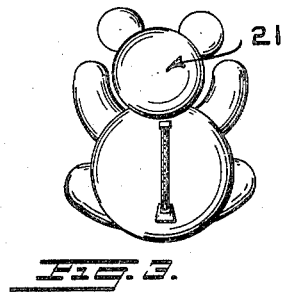
Fig. 3 is a rear elevational view of the stuffed animal shown in Figs. 1 and 2.
Figure 4:
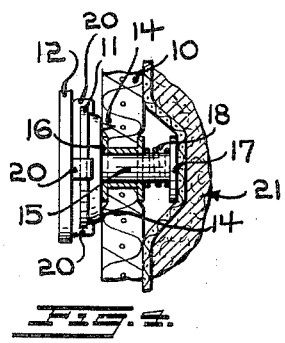
Fig. 4 is a fragmentary enlarged vertical sectional view taken on the line 4—4 of Fig. 1.

In Figs. 1 to 3 inclusive, a stuffed Teddy bear 21 is illustrated, by way of example only. The stuffed animal may be any animal, or any doll. The particular features 12 simulate the eyes, nose and mouth. This is also by way of illustration, since the features may comprise other features of the animal, or doll.

Figure 5:
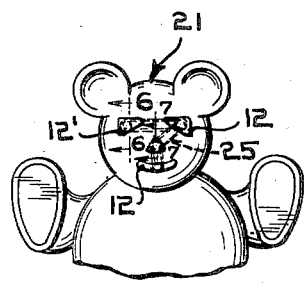
Fig. 5 is a fragmentary enlarged elevational view of a stuffed animal constructed in accordance with a modified form of this invention.
Figure 6:
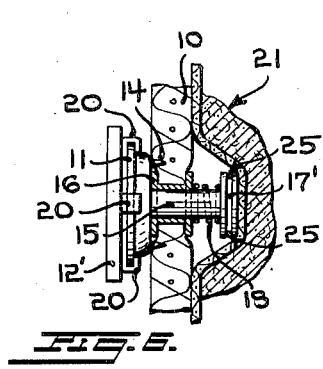
Fig. 6 is a fragmentary enlarged vertical sectional view taken on the lines 6—6 of Fig. 5.
Figure 7:
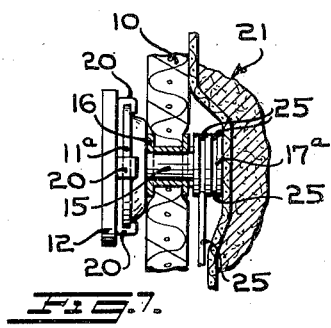
Fig. 7 is a fragmentary enlarged vertical sectional view taken on the line 7—7 of Fig. 5.

In Figs. 5 to 7 inclusive, a modified form of the invention has been disclosed which is very similar to the prior form distinguished merely by the fact that a system connects the various buttons together, into a connected unit arranged so that when one button is moved the other buttons will move in unison. With this arrangement it is possible to move one eye, to change its inclination, and simultaneously the other eye will move, as well as the nose, and mouth, if this is desired. More specifically, one of the feature members identified by reference numeral 12', is mounted on a button 11 which has prongs 14 engageable with the outer layer of material 10.

The head 17' of the stem 15 is constructed in the nature of a drum. The heads 17a of the stems 15 of the other buttons 11a, are also constructed in the nature of drums. A cord system 25 connects the drums 17a with the drums 17', for unitary movements. The cord system 25 comprises a number of cord belts engaged over the drums. Friction means, or other means, is depended upon to hold the belts in facial engagement with the drums to transmit turning. The buttons 11a, see Fig. 7, distinguish from the buttons 11 by the fact that they are not provided with holding prongs, similar to the prongs 14.

In other respects this form of the invention is identical to the prior form and similar parts may be recognized by similar reference numerals.

The operation and use of the new convertible feature doll, or animal may be understood from the following:

The features 12 of the doll may be removed, or replaced and exchanged whenever desired. Each of the features may be moved, to change their inclinations for the purpose of changing the expression of the doll, or animal. In the first form of the invention it is necessary that the prongs 14 of each of the buttons 11 be disengaged from the outer layer of material 10 to free the buttons 11 to be turned. This indirectly frees the features. The springs 18 permit the stems 15 to be slightly pulled out for the purpose of disengaging the prongs 14 from said outer layer 10. When the features 12, or buttons 11 are released the springs 18 move the stems 15 inwards, and reengage the prongs 14 with the outer layer 10.

In the second form of the invention, the feature 12' or buttons 11 upon which this feature is mounted may be manually pulled out to compress the spring 18 so as to disengage the prongs 14 from the outer layer of material 10. Now the feature 12' may be turned. The belt system 25 will transmit the turning movement indirectly to the other features 12. In this way the other features will be turned. When the feature 12' is released the spring 18 will move the stem 15 inwards and cause the prongs 14 to reengage the outer layer of material 10. This locks the other features 12 against movement because of the inter-connection of said belt system 25.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A movable feature for a doll or the like, comprising a body member having a wall, a stem rotatively and axially slidably extended through said wall of said body member, a flange formed on the inner end of said stem, a button formed on the outer end of said stem, a feature member releasably mounted on the front face of said button, prongs formed on the back face of said button and engageable with the front face of said wall for holding said stem and in turn said feature member against rotating, and resilient means operating between said flange and the adjacent face of said wall urging said stem and in turn said button into a position in which said prongs on said button will engage the face of said wall, whereby said button may be gripped and used to pull said stem axially forward to disengage said prongs from the front face of said body member freeing said stem to be rotated to turn said feature member into a different rotative position.

2. A movable feature for a doll or the like, comprising a body member having a wall, a stem rotatively and axially slidably extended through said wall of said body member, a flange formed on the inner end of said stem, a button formed on the outer end of said stem, a feature member releasably mounted on the front face of said button, prongs formed on the back face of said button and engageable with the front face of said wall for holding said stem and in turn said feature member against rotating, and resilient means operating between said flange and the adjacent face of said wall urging said stem and in turn said button into a position in which said prongs on said button will engage the face of said wall, whereby said button may be gripped and used to pull said stem axially forward to disengage said prongs from the front face of said body member freeing said stem to be rotated to turn said feature member into a different rotative position, and an eyelet mounted through said wall of said body member and through which said stem rotatively and axially slidably extends.

3. A movable feature for a doll or the like, comprising a body member having a wall, a stem rotatively and axially slidably extended through said wall of said body member, a flange formed on the inner end of said stem, a button formed on the outer end of said stem, a feature member releasably mounted on the front face of said button, prongs formed on the back face of said button and engageable with the front face of said wall for holding said stem and in turn said feature member against rotating, and resilient means operating between said flange and the adjacent face of said wall urging said stem and in turn said button into a position in which said prongs on said button will engage the face of said wall, whereby said button may be gripped and used to pull said stem axially forward to disengage said prongs from the front face of said body member freeing said stem to be rotated to turn said feature member into a different rotative position, said resilient means comprising an expansion spring mounted on said stem and operating between said flange and the adjacent face of said body member.

4. Movable features for a doll or the like, comprising a body member having a wall, a pair of spaced stems extended through said wall of said body member, one of said stems being rotative and the other of said stems being rotative and axially slidable, buttons mounted on the outer ends of said stems, feature members releasably mounted on the front faces of said buttons, drums formed on the inner ends of said stems, and endless cord engaged over said drums connecting said drums for simultaneous rotation when one of said drums is rotated, prongs formed on the back face of said button mounted on the said other of said stems for engaging the front face of said wall to hold said stems against rotation, and resilient means on the said other of said stems urging the said other of said stems into a position in which the prongs of its respective button will engage the front face of said wall, whereby said button of the said other of said stems may be gripped to pull the said other of said stems axially forward to disengage said prongs from said wall freeing the said other of said stems to be rotated to simultaneously rotate the said one stem through the medium of said drums and endless cord to change the rotative positions of said feature members.

5. Movable features for a doll or the like, comprising a body member having a wall, a pair of spaced stems extended through said wall of said body member, one of said stems being rotative and the other of said stems being rotative and axially slidable, buttons mounted on the outer ends of said stems, feature members releasably mounted on the front faces of said buttons, drums formed on the inner ends of said stems, and endless cord engaged over said drums connecting said drums for simultaneous rotation when one of said drums is rotated, prongs formed on the back face of said button mounted on the said other of said stems for engaging the front face of said wall to hold said stems against rotation, and resilient means on the said other of said stems urging the said other of said stems into a position in which the prongs of its respective button will engage the front face of said wall, whereby said button of the said other of said stems may be gripped to pull the said other of said stems axially forward to disengage said prongs from said wall freeing the said other of said stems to be rotated to simultaneously rotate the said one stem through the medium of said drums and endless cord to change the rotative positions of said features members, and spaced eyelets mounted through said wall of said body member and through which said stems engage.

6. Movable features for a doll or the like, comprising a body member having a wall, a pair of spaced stems extended through said wall of said body member, one of said stems being rotative and the other of said stems being rotative and axially slidable, buttons mounted on the outer ends of said stems, feature members releasably mounted on the front faces of said buttons, drums formed on the inner ends of said stems, and endless cord engaged over said drums connecting said drums for simultaneous rotation when one of said drums is rotated, prongs formed on the back face of said button mounted on the said other of said stems for engaging the front face of said wall to hold said stems against rotation, and resilient means on the said other of said stems urging the said other of said stems into a position in which the prongs of its respective button will engage the front face of said wall, whereby said button of the said other of said stems may be gripped to pull the said other of said stems axially forward to disengage said prongs from said wall freeing the said other of said stems to be rotated to simultaneously rotate the said one stem through the medium of said drums and endless cord to change the rotative positions of said feature members, said resilient means comprising an expansion spring mounted on the said other of said stems and operating between its respective drum and the adjacent face of said wall.

ANN KAZIMIR DVORAK.

REFERENCES CITED

The following references are of record in the file of this patent:

UNITED STATES PATENTS

| Number | Name | Date |
|---|---|---|
| 401,720 | Scott | Apr. 16, 1889 |
| 874,083 | Jonah | Dec. 17, 1907 |
| 974,059 | Haynes | Oct. 25, 1910 |
| 1,028,842 | Marshall | June 4, 1912 |
| 1,120,456 | Devall | Dec. 8, 1914 |
| 1,490,624 | Mitchel | Apr. 15, 1924 |
| 1,647,369 | Marks | Nov. 1, 1927 |
| 2,012,468 | Klema | Aug. 27, 1935 |
| 2,139,145 | Young | Dec. 6, 1938 |
| 2,271,312 | Shorter | Jan. 27, 1942 |

FOREIGN PATENTS

| Number | Country | Date |
|---|---|---|
| 45,356 | France | Jan. 25, 1934 |